(12) United States Patent
Oh et al.

(10) Patent No.: US 9,066,218 B2
(45) Date of Patent: Jun. 23, 2015

(54) METHOD AND APPARATUS FOR ALLOCATING RESOURCES IN A WIRELESS COMMUNICATION SYSTEM AND SYSTEM THEREOF

(75) Inventors: Chang-Yoon Oh, Yongin-si (KR); June Moon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1084 days.

(21) Appl. No.: 12/247,385

(22) Filed: Oct. 8, 2008

(65) Prior Publication Data

US 2010/0061314 A1 Mar. 11, 2010

(30) Foreign Application Priority Data

Sep. 5, 2008 (KR) ........................ 10-2008-0087977

(51) Int. Cl.
  H04W 4/00 (2009.01)
  H04W 4/20 (2009.01)
  H04L 5/00 (2006.01)
  H04L 27/26 (2006.01)
  H04L 1/18 (2006.01)
  H04W 28/04 (2009.01)
  H04W 72/04 (2009.01)

(52) U.S. Cl.
  CPC .............. *H04W 4/20* (2013.01); *H04L 1/1812* (2013.01); *H04L 1/1887* (2013.01); *H04L 5/0007* (2013.01); *H04L 5/0044* (2013.01); *H04L 27/2626* (2013.01); *H04W 28/04* (2013.01); *H04W 72/04* (2013.01)

(58) Field of Classification Search
  USPC ........................................................ 370/329
  See application file for complete search history.

(56) References Cited

U.S. PATENT DOCUMENTS

| 8,010,151 | B2 | 8/2011 | Kim et al. | |
| 8,054,818 | B2 | 11/2011 | Kwon et al. | |
| 2007/0189197 | A1 | 8/2007 | Kwon et al. | |
| 2008/0310362 | A1* | 12/2008 | McBeath et al. | ............. 370/330 |
| 2009/0257389 | A1* | 10/2009 | Mohanty et al. | ............. 370/329 |
| 2009/0313515 | A1* | 12/2009 | Barve | ........................ 714/748 |

FOREIGN PATENT DOCUMENTS

| JP | 2010517461 A | 5/2010 |
| KR | 10-2007-0075839 A | 7/2007 |
| KR | 10-2007-0097862 A | 10/2007 |

OTHER PUBLICATIONS

Of NPL document IEEE 802.16 Broadband Wireless Access Working Group, Persistent Allocation Updated Procedures, dated Apr. 19, 2008.*
Changyoon Oh, "HARQ Region Change", WiMAX Forum, Mar. 14, 2008, http://www.wimaxforum.org.
(Continued)

*Primary Examiner* — Gregory Sefcheck
*Assistant Examiner* — Majid Esmaeilian
(74) *Attorney, Agent, or Firm* — Jefferson IP Law, LLP

(57) ABSTRACT

A method and apparatus for allocating resources in a wireless communication system is provided. A Base Station (BS) allocates persistent resources in a Hybrid Automatic Repeat Request (HARQ) region to a Mobile Station (MS), changes a location of the HARQ region, changes location of persistent resources in the HARQ region to location of persistent resources in a new HARQ region, and allocates the persistent resource to the MS. The new HARQ region is the location-changed HARQ region.

44 Claims, 9 Drawing Sheets

(56) References Cited

OTHER PUBLICATIONS

Geunhwi Lim, "TWG Agreements on MAC Efficiency", WiMAX Forum, Mar. 15, 2008, http://www.wimaxforum.org.

June Moon et al., "Persistent Allocation—Remaining Issues", "Issue #1. Flexible HARQ Region change, Issue #2. ReTx IE, Issue #3 Secondary Error Recovery", WiMAX Forum, Apr. 3, 2008, http://www.wimaxforum.org.

Changyoon Oh, "Persistent Allocation—Remaining Issues", "Issue #1: Flexible HARQ Region change, Issue #2: ReTxIE, Issue #3: Secondary Error Recovery, Issue #4: Sub MAP Operation", WiMAX Forum, Apr. 7, 2008, http://www.wimaxforum.com.

Changyoon Oh, "Persistent Allocation—Remaining Issues", "Issue #1: Flexible HARQ Region change, Issue #2: ReTxIE, Issue #3: Secondary Error Recovery, Issue #4: Sub MAP operation, Issue #5: FDD/H-FDD Group switching", WiMAX Forum, Apr. 14, 2008, http://www.wimaxforum.com.

Yair Bourlas et al., "Persistent Allocation Updated Procedures", IEEE 802.16 Broadband Wireless Access Working Group, IEEE C802.16maint-08/182, Apr. 19, 2008, http://ieee802.org/16/maint/.

Yair Bourlas et al., "Persistent Allocation Updated Procedures", IEEE 802.16 Broadband Wireless Access Working Group, IEEE C802.16maint-08/182r1, May 6, 2008, http://ieee802.org/16/maint/#contrib.

Yair Bourlas et al., "Persistent Allocation Updated Procedures", IEEE 802.16 Broadband Wireless Access Working Group, IEEE C802.16maint-08/181r1, May 8, 2008, http://ieee802.org/16/maint/#contrib.

Yair Bourlas et al., "Persistent Allocation Updated Procedures", IEEE 802.16 Broadband Wireless Access Working Group, IEEE C802.16maint-08/182r2, May 9, 2008, http://ieee802.org/16/maint/#contrib.

Yair Bourlas et al., "Persistent Allocation Updated Procedures", IEEE 802.16 Broadband Wireless Access Working Group, IEEE C802.16maint-08/182r3, May 11, 2008, http://ieee802.org/16/maint/#contrib.

Yair Bourlas et al., "Persistent Allocation Updated Procedures", IEEE 802.16 Broadband Wireless Access Working Group, IEEE C802.16maint-08/182r4, May 12, 2008, http://ieee802.org/16/maint/#contrib.

Yair Bourlas et al., "Persistent Allocation Updated Procedures", IEEE 802.16 Broadband Wireless Access Working Group, IEEE C802.16maint-08/182r5, May 12, 2008, http://ieee802.org/16/maint/#contrib.

Yair Bourlas et al., "Persistent Allocation Updated Procedures", IEEE 802.16 Broadband Wireless Access Working Group, IEEE C802.16maint-08/182r6, May 13, 2008, http://ieee802.org/16/maint/#contrib.

Yair Bourlas et al., "Persistent Allocation Updated Procedures", IEEE 802.16 Broadband Wireless Access Working Group, IEEE C802.16maint-08/182r7, May 13, 2008, http://ieee802.org/16/maint/#contrib.

Yair Bourlas et al., "Persistent Allocation Updated Procedures", IEEE 802.16 Broadband Wireless Access Working Group, IEEE C802.16maint-08/182r8, May 13, 2008, http://ieee802.org/16/maint/#contrib.

DRAFT Standard for Local and Metropolitan area networks, "Part 16: Air Interface for Broadband Wireless Access Systems", P802.16Rev2/D5, Jun. 6, 2008, IEEE, New York, NY, pp. 1-16 and 448, http://www.ieee802.org/16/pubs/80216Rev2.html.

DRAFT Standard for Local and Metropolitan area networks, "Part 16: Air Interface for Broadband Wireless Access Systems", P802.16Rev2/D6, Jul. 24, 2008, IEEE, New York, NY, pp. 1-16, 493 and 494, http://www.ieee802.org/16/pubs180216Rev2.html.

DRAFT Standard for Local and Metropolitan area networks, "Part 16: Air Interface for Broadband Wireless Access Systems", P802.16Rev2/D6a, Jul. 24, 2008, IEEE, New York, NY, pp. 1-16, 493 and 494, http://www.ieee802.org/16/pubs/80216Rev2.html.

* cited by examiner

_US 9,066,218 B2_

METHOD AND APPARATUS FOR ALLOCATING RESOURCES IN A WIRELESS COMMUNICATION SYSTEM AND SYSTEM THEREOF

PRIORITY

This application claims the benefit under 35 U.S.C. §119(a) of a Korean patent application filed in the Korean Intellectual Property Office on Sep. 5, 2008 and assigned Serial No. 2008-87977, the entire disclosure of which is hereby incorporated by reference.

BACKGROUND OF THE INVENTION

1. Field of the Invention

The present invention relates to a method and apparatus for allocating resources in a wireless communication system and a system thereof. More particularly, the present invention relates to a method and apparatus for allocating resources in a wireless communication system using a persistent scheduling scheme and a system thereof.

2. Description of the Related Art

Next-generation communication systems are being developed to provide various high-speed, high-capacity services to Mobile Stations (MSs). Next-generation communication systems recently discussed include an Institute of Electrical and Electronics Engineers (IEEE) 802.16 communication system and a Mobile Worldwide Interoperability for Microwave Access (WiMAX) communication system. The Mobile WiMAX communication system is a communication system based on the IEEE 802.16 communication system.

With reference to FIG. 1, a description will now be made of a method for allocating DownLink (DL) resources using a persistent scheduling scheme in an IEEE 802.16 communication system.

FIG. 1 is a diagram schematically illustrating a method for allocating DL resources using a persistent scheduling scheme in an IEEE 802.16 communication system.

Referring to FIG. 1, a Base Station (BS) allocates persistent resources 120 of a Hybrid Automatic Repeat Request (HARQ) region 100 to an arbitrary MS, e.g., MS1, using a persistent scheduling scheme. After allocating the persistent resources 120 to the MS1, the BS transmits resource allocation information for the persistent resources 120 to the MS1 using a DL MAP message including a Persistent HARQ DL MAP Information Element (IE).

The Persistent HARQ DL MAP IE includes HARQ region definition information of the HARQ region 100, a Persistent Region Identifier (ID) for identifying the HARQ region 100, a slot offset, and duration information. The HARQ region definition information includes an Orthogonal Frequency Division Multiple Access (OFDMA) symbol offset, a subchannel offset, the number of OFDMA symbols, and the number of subchannels.

The HARQ region 100 is defined by the OFDMA symbol offset, the subchannel offset, the number of OFDMA symbols, and the number of subchannels. That is, the HARQ region 100 represents a two-dimensional region occupied by OFDMA symbols corresponding to the number of OFDMA symbols and subchannels corresponding to the number of subchannels on the basis of a start region 110. The start region 110 represents a region corresponding to the lowest-numbered OFDMA symbol in the lowest-numbered subchannel of the HARQ region 100, and it will be assumed to be, for example, a slot. In addition, the persistent resources 120 include the slots that correspond to information on the duration from the location that is spaced apart from the start region 110 by slots, the number of which corresponds to the slot offset.

With reference to FIG. 2, a description will now be made of a method for allocating UpLink (UL) resources using the persistent scheduling scheme in an IEEE 802.16 communication system.

FIG. 2 is a diagram schematically illustrating a method for allocating UL resources using a persistent scheduling scheme in an IEEE 802.16 communication system.

Referring to FIG. 2, a BS allocates persistent resources 220 to an arbitrary MS, e.g., MS1, using the persistent scheduling scheme in a start region 210 of a HARQ region. After allocating the persistent resources 220 to the MS1, the BS transmits resource allocation information for the persistent resources 220 to the MS1 using a UL MAP message including a Persistent HARQ UL MAP IE.

The Persistent HARQ UL MAP IE includes HARQ region definition information, a Persistent Region ID for identifying the HARQ region, a slot offset, and duration information. The HARQ region definition information includes an OFDMA symbol offset and a subchannel offset. The HARQ region is defined by the OFDMA symbol offset and the subchannel offset. That is, in the UL, unlike in the DL, since the HARQ region is defined not in two dimensions, but in one dimension, the HARQ region is defined in one dimension beginning from the start region 210. The start region 210 represents a slot corresponding to the lowest-numbered OFDMA symbol in the lowest-numbered subchannel of the HARQ region. In addition, the persistent resources 220 include the slots that correspond to information on the duration from the location that is spaced apart from the start region 210 by slots, the number of which corresponds to the slot offset.

Resources allocated to an MS using the persistent scheduling scheme are persistently maintained without being changed every periodic frame, e.g., every P frames, unless the BS releases the resource allocation for the MS or changes the resources allocated to the MS. However, the IEEE 802.16e communication system can variably manage the location of the HARQ region every frame. When the location of the HARQ region is changed in this way, it may be difficult to persistently allocate resources using the persistent scheduling scheme.

SUMMARY OF THE INVENTION

An aspect of the present invention is to address at least the above-mentioned problems and/or disadvantages and to provide at least the advantages described below. Accordingly, an aspect of the present invention is to provide a method and apparatus for allocating resources in a wireless communication system, and a system thereof.

Another aspect of the present invention is to provide a method and apparatus for allocating resources taking into account a location change of a HARQ region in a wireless communication system, and a system thereof.

According to one aspect of the present invention, a method for allocating resources by a Base Station (BS) in a wireless communication system is provided. The method includes allocating persistent resources in a Hybrid Automatic Repeat Request (HARQ) region to a Mobile Station (MS), changing a location of the HARQ region, and changing the location of the persistent resources in the HARQ region to location of persistent resources in a new HARQ region, and allocating the persistent resources in the new HARQ region to the MS. The new HARQ region comprises the location-changed HARQ region.

According to another aspect of the present invention, a method for allocating resources by a Base Station (BS) in a wireless communication system is provided. The method includes transmitting to a Mobile Station (MS) a first resource allocation message including Hybrid Automatic Repeat Request (HARQ) region definition information of a HARQ region, a Persistent Region Identifier (ID), and location information of persistent resources in the HARQ region to allocate the persistent resources in the HARQ region to the MS, when a location of the HARQ region is changed, setting a Persistent Region ID of a new HARQ region, which is the location-changed HARQ region, to be identical to a Persistent Region ID of the HARQ region, and transmitting to the MS a second resource allocation message including HARQ region definition information of the new HARQ region and the Persistent Region ID of the new HARQ region.

According to further another aspect of the present invention, a method for allocating resources by a Mobile Station (MS) in a wireless communication system is provided. The method includes receiving a first resource allocation message used for allocating persistent resources in a Hybrid Automatic Repeat Request (HARQ) region, determining a location of persistent resources in the HARQ region according to the first resource allocation message, receiving a second resource allocation message used for changing location of the persistent resources in the HARQ region to location of persistent resources in a new HARQ region according to a location change of the HARQ region and allocating the persistent resources in the new HARQ region, and determining a location of the persistent resources in the new HARQ region according to location information of the persistent resources in the HARQ region and the second resource allocation message. The new HARQ region comprises the location-changed HARQ region.

According to yet another aspect of the present invention, a method for allocating resources by a Mobile Station (MS) in a wireless communication system is provided. The method includes receiving a first resource allocation message including Hybrid Automatic Repeat Request (HARQ) region definition information of a HARQ region, a Persistent Region Identifier (ID), and location information of persistent resources in the HARQ region to allocate the persistent resources in the HARQ region, storing the HARQ region definition information and the Persistent Region ID, determining a location of persistent resources in the HARQ region according to the first resource allocation message, and upon receipt of a second resource allocation message including a Persistent Region ID identical to the stored Persistent Region ID, determining a location of persistent resources in a new HARQ region according to the location information of the persistent resources in the HARQ region and the second resource allocation message. The new HARQ region comprises the HARQ region location-changed according to a location change of the HARQ region, and the second resource allocation message includes HARQ region definition information of the new HARQ region and the Persistent Region ID.

According to still another aspect of the present invention, a method for allocating resources in a wireless communication system is provided. The method includes allocating, by a Base Station (BS), persistent resources in a Hybrid Automatic Repeat Request (HARQ) region to a Mobile Station (MS), and transmitting to the MS a first resource allocation message used for allocating the persistent resources in the HARQ region, receiving, by the MS, the first resource allocation message, determining, by the MS, a location of persistent resources in the HARQ region according to the first resource allocation message, changing, by the BS, a location of the HARQ region, changing, by the BS, the location of the persistent resources in the HARQ region to location of persistent resources in a new HARQ region, allocating the persistent resources in the new HARQ region to the MS, and transmitting to the MS a second resource allocation message used for changing the location of the persistent resources in the HARQ region to the persistent resources in the new HARQ region and allocating the persistent resources to the MS receiving, by the MS, the second resource allocation message, and determining, by the MS, a location of the persistent resources in the new HARQ region according to location information of the persistent resources in the HARQ region and the second resource allocation message. The new HARQ region comprises the location-changed HARQ region.

According to still another aspect of the present invention, a method for allocating resources in a wireless communication system is provided. The method includes transmitting, by a Base Station (BS), to a Mobile Station (MS) a first resource allocation message including Hybrid Automatic Repeat Request (HARQ) region definition information of a HARQ region, a Persistent Region Identifier (ID), and location information of persistent resources in the HARQ region to allocate the persistent resources in the HARQ region to the MS, receiving, by the MS, the first resource allocation message, storing, by the MS, the HARQ region definition information and the Persistent Region ID, determining, by the MS, a location of persistent resources in the HARQ region according to the first resource allocation message, when a location of the HARQ region is changed, setting, by the BS, a Persistent Region ID of a new HARQ region, which comprises the location-changed HARQ region, to be identical to a Persistent Region ID of the HARQ region, transmitting, by the BS, to the MS a second resource allocation message including HARQ region definition information of the new HARQ region and the Persistent Region ID of the new HARQ region, and upon receipt of the second resource allocation message including a Persistent Region ID identical to the stored Persistent Region ID, determining, by the MS, a location of persistent resources in the new HARQ region according to the location information of the persistent resources in the HARQ region and the second resource allocation message.

According to still another aspect of the present invention, a Base Station (BS) apparatus in a wireless communication system is provided. The BS apparatus includes a controller for allocating persistent resources in a Hybrid Automatic Repeat Request (HARQ) region to a Mobile Station (MS), for changing a location of the HARQ region, for changing the location of the persistent resources in the HARQ region to persistent resources in a new HARQ region, and for allocating the persistent resources in the new HARQ region to the MS. The new HARQ region comprises the location-changed HARQ region.

According to still another aspect of the present invention, a Base Station (BS) apparatus in a wireless communication system is provided. The BS apparatus includes a transmitter for transmitting to a Mobile Station (MS) a first resource allocation message including Hybrid Automatic Repeat Request (HARQ) region definition information of a HARQ region, a Persistent Region Identifier (ID), and location information of persistent resources in the HARQ region to allocate the persistent resources in the HARQ region to the MS, and for transmitting to the MS a second resource allocation message including HARQ region definition information and a Persistent Region ID of a new HARQ region, and a controller, when a location of the HARQ region is changed, for setting a Persistent Region ID of the new HARQ region, which comprises the location-changed HARQ region, to be identical to a Persistent Region ID of the HARQ region.

According to still another aspect of the present invention, a Mobile Station (MS) apparatus in a wireless communication system is provided. The MS apparatus includes a receiver for receiving a first resource allocation message used for allocating persistent resources in a Hybrid Automatic Repeat Request (HARQ) region, for receiving a second resource allocation message used for changing location of persistent resources in the HARQ region to location of persistent resources in a new HARQ region according to a location change of the HARQ region, and for allocating the persistent resources in the new HARQ region, and a controller for determining a location of persistent resources in the HARQ region according to the first resource allocation message, and for determining a location of the persistent resources in the new HARQ region according to location information of the persistent resources in the HARQ region and the second resource allocation message. The new HARQ region comprises the location-changed HARQ region.

According to still another aspect of the present invention, a Mobile Station (MS) apparatus in a wireless communication system is provided. The apparatus includes a receiver for receiving a first resource allocation message including Hybrid Automatic Repeat Request (HARQ) region definition information of a HARQ region, a Persistent Region Identifier (ID), and location information of persistent resources in the HARQ region to allocate the persistent resources in the HARQ region, and for receiving a second resource allocation message including a Persistent Region ID, and a controller for storing the HARQ region definition information and the Persistent Region ID, for determining a location of persistent resources in the HARQ region according to the first resource allocation message, and for determining a location of persistent resources in a new HARQ region according to location information of the persistent resources in the HARQ region and the second resource allocation message if the Persistent Region ID included in the second resource allocation message is identical to the stored Persistent Region ID. The new HARQ region comprises the HARQ region location-changed according to a location change of the HARQ region, and the second resource allocation message includes HARQ region definition information of the new HARQ region and the Persistent Region ID.

According to still another aspect of the present invention, a wireless communication system is provided. The system includes a Base Station (BS) for allocating persistent resources in a Hybrid Automatic Repeat Request (HARQ) region to a Mobile Station (MS), for transmitting to the MS a first resource allocation message used for allocating the persistent resources in the HARQ region, for changing a location of the HARQ region, for changing the location of the persistent resources in the HARQ region to persistent resources in a new HARQ region, for allocating the persistent resources in the new HARQ region to the MS, and for transmitting to the MS a second resource allocation message used for changing the location of the persistent resources in the HARQ region to the persistent resources in the new HARQ region and for allocating the persistent resources in the new HARQ region to the MS, and the MS for receiving the first resource allocation message, for determining a location of persistent resources in the HARQ region according to the first resource allocation message, for receiving the second resource allocation message, and for determining a location of the persistent resources in the new HARQ region according to location information of the persistent resources in the HARQ region and the second resource allocation message. The new HARQ region comprises the location-changed HARQ region.

According to still another aspect of the present invention, a wireless communication system is provided. The system includes a Base Station (BS) for transmitting to a Mobile Station (MS) a first resource allocation message including Hybrid Automatic Repeat Request (HARQ) region definition information of a HARQ region, a Persistent Region Identifier (ID), and location information of persistent resources in the HARQ region to allocate the persistent resources in the HARQ region to the MS, for setting, when a location of the HARQ region is changed, a Persistent Region ID of a new HARQ region, which comprises the location-changed HARQ region, to be identical to the Persistent Region ID of the HARQ region, and for transmitting to the MS a second resource allocation message including HARQ region definition information of the new HARQ region and the Persistent Region ID of the new HARQ region, and the MS for receiving the first resource allocation message, for storing the HARQ region definition information and the Persistent Region ID, for determining a location of persistent resources in the HARQ region according to the first resource allocation message, and upon receipt of the second resource allocation message including a Persistent Region ID identical to the stored Persistent Region ID, for determining a location of the persistent resources in the new HARQ region according to the location information of the persistent resources in the HARQ region and the second resource allocation message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description when taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

Exemplary embodiments of the present invention provide a method and apparatus for allocating resources in a wireless communication system, and a system thereof. In addition, exemplary embodiments of the present invention provide a resource allocation method and apparatus for persistently allocating resources while taking into account a location change of a Hybrid Automatic Repeat Request (HARQ) region in a wireless communication system using a persistent scheduling scheme, and a system thereof. Although a description of exemplary embodiments of the present invention will be given herein with reference to an Institute of Electrical and Electronics Engineers (IEEE) 802.16 communication system as an example of a wireless communication system, the resource allocation method and apparatus and a system thereof proposed by the present invention can be used not only in the IEEE 802.16 communication system but also in another wireless communication system, such as Mobile Worldwide Interoperability for Microwave Access (WiMAX) communication system. In addition, the term 'persistent resources of a HARQ region' as used herein refers to persistent resources allocated in a HARQ region, and the term 'persistent resources of a new HARQ region' as used herein refers to persistent resources allocated in a new HARQ region.

Figure 1:
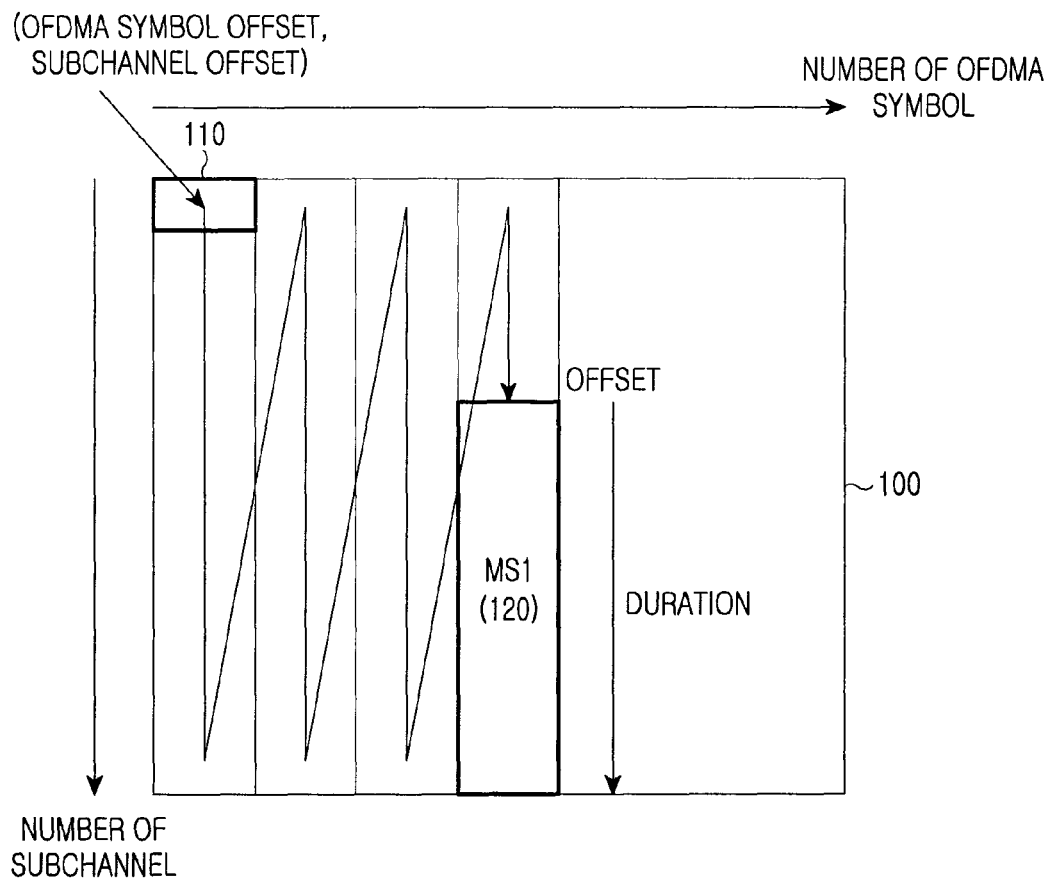
FIG. 1 is a diagram schematically illustrating a method for allocating DL resources using a persistent scheduling scheme in an IEEE 802.16 communication system.
Figure 2:
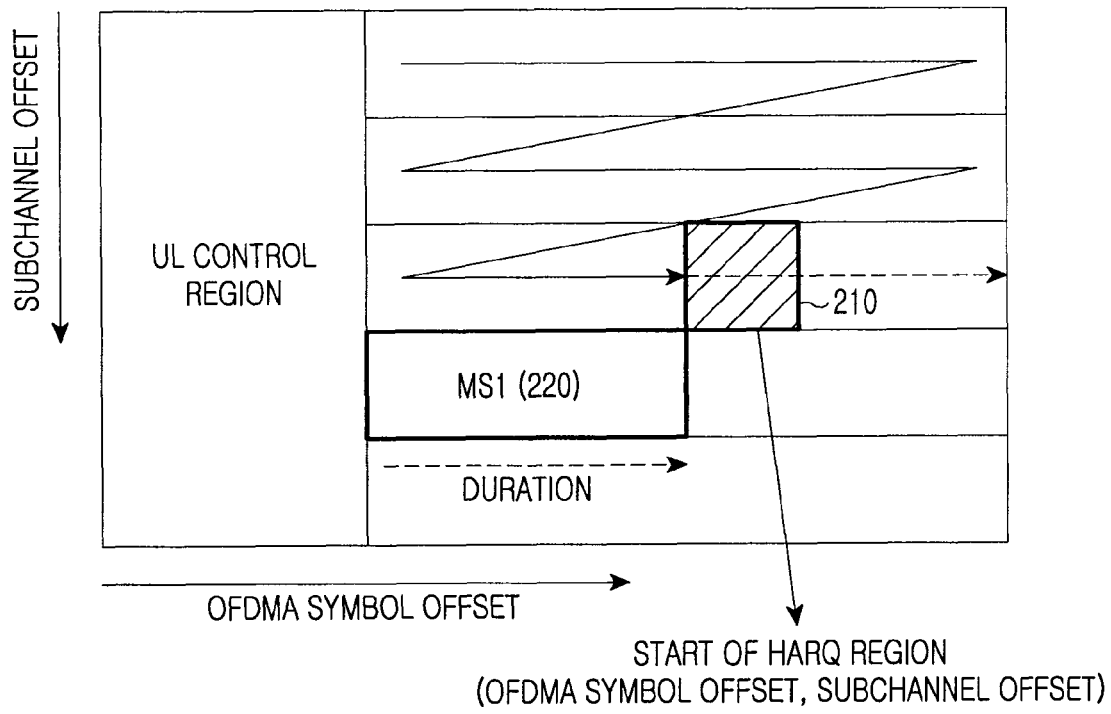
FIG. 2 is a diagram schematically illustrating a method for allocating UL resources using a persistent scheduling scheme in an IEEE 802.16 communication system.
Figure 3:
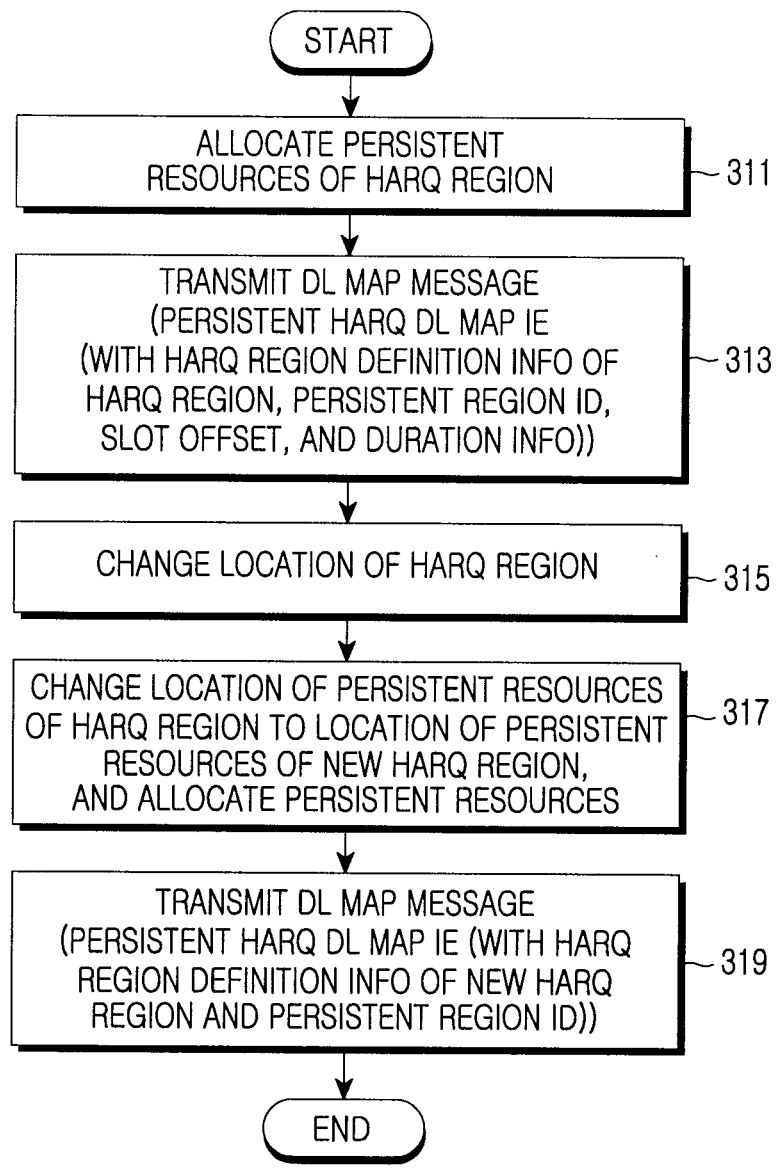
FIG. 3 is a flowchart illustrating a procedure for allocating DL resources using a persistent scheduling scheme by a BS in an IEEE 802.16 communication system according to an exemplary embodiment of the present invention.

FIG. 3 is a flowchart illustrating a procedure for allocating DownLink (DL) resources using a persistent scheduling scheme by a Base Station (BS) in an IEEE 802.16 communication system according to an exemplary embodiment of the present invention.

Referring to FIG. 3, in step 311, the BS allocates persistent resources of a HARQ region to an arbitrary Mobile Station (MS). In step 313, the BS generates a DL MAP message including a Persistent HARQ DL MAP Information Element (IE), transmits the generated DL MAP message to the MS, and then proceeds to step 315. The Persistent HARQ DL MAP IE includes HARQ region definition information of the HARQ region, a Persistent Region Identifier (ID) for identifying the HARQ region, a slot offset, and duration information. The HARQ region definition information includes an Orthogonal Frequency Division Multiple Access (OFDMA) symbol offset, a subchannel offset, the number of OFDMA symbols, and the number of subchannels. The HARQ region is defined herein by the OFDMA symbol offset, the subchannel offset, the number of OFDMA symbols, and the number of subchannels. That is, the HARQ region represents a two-dimensional region occupied by OFDMA symbols corresponding to the number of OFDMA symbols and subchannels corresponding to the number of subchannels on the basis of a start region. The start region represents a region corresponding to the lowest-numbered OFDMA symbol in the lowest-numbered subchannel of the HARQ region, and it will be assumed to be, for example, a slot. In addition, the allocated persistent resources include the slots that correspond to information on the duration from the location which is spaced apart from the start region by slots, the number of which corresponds to the slot offset. In conclusion, the slot offset is location information of the persistent resources.

In step 315, upon detecting the need to change a location of the HARQ region, the BS changes a location of the HARQ region, and then proceeds to step 317. The need to change a location of the HARQ region can be detected in the following cases. First, the need occurs when a location of the HARQ region is changed as a size of a MAP region increases. That is, in this case, the MAP region may collide with the HARQ region when a particular frame, e.g., frame # (K+2P) is greater than the previous frame, e.g., frame # (K+P), in the amount of resources to be allocated, or the number of Medium Access Control (MAC) management messages to be transmitted, so the MAP region size of the frame # (K+2P) is greater than the MAP region size of the frame # (K+P). Second, the need occurs when a ratio of a DL subframe to an UpLink (UL) subframe of the IEEE 802.16e communication system is changed. That is, in this case, a location of the HARQ region is changed as the locations of the DL subframe and the UL subframe are changed. Third, the need occurs when a non-HRAQ region is changed in the frame. That is, in this case, a location of the HARQ region is changed as the non-HRAQ region is changed. Meanwhile, the BS can detect the need to change a location of the HARQ region through a scheduling operation and the like.

In step 317, the BS changes the persistent resources of the HARQ region to persistent resources of the location-changed HARQ region, i.e., new HARQ region, allocates the changed persistent resources to the MS, and then proceeds to step 319. A detailed description will now be made of a process in which the BS changes the location of the persistent resources of the HARQ region to persistent resources of the new HARQ region, and allocates the changed persistent resources to the MS.

A location of the new HARQ region is different from a location of the HARQ region, and HARQ region definition information representing the new HARQ region is also different from HARQ region definition information of the HARQ region. Therefore, the BS changes the location of the persistent resources of the HARQ region allocated to the MS, to the slots that correspond to information on the duration from the location which is spaced apart from a start region of the new HARQ region by slots, the number of which corresponds to the slot offset, and then allocates the persistent resources.

In step 319, the BS generates a DL MAP message including a Persistent HARQ DL MAP IE, and transmits the generated DL MAP message to the MS. The Persistent HARQ DL MAP IE may include only the HARQ region definition information and the Persistent Region ID of the new HARQ region, and may not include the slot offset and the duration information. Also, the HARQ region definition information of the new HARQ region includes an OFDMA symbol offset, a subchannel offset, the number of OFDMA symbols, and the number of subchannels. Of course, the Persistent Region ID included in the Persistent HARQ DL MAP IE described in step 319 is equal to the Persistent Region ID included in the Persistent HARQ DL MAP IE described in step 313. In the case where the BS persistently allocates resources to the MS as described in FIG. 3, even though a location of the HARQ region is changed, there is no need to separately include the slot offset and the duration information in the Persistent HARQ DL MAP IE.

Figure 4:
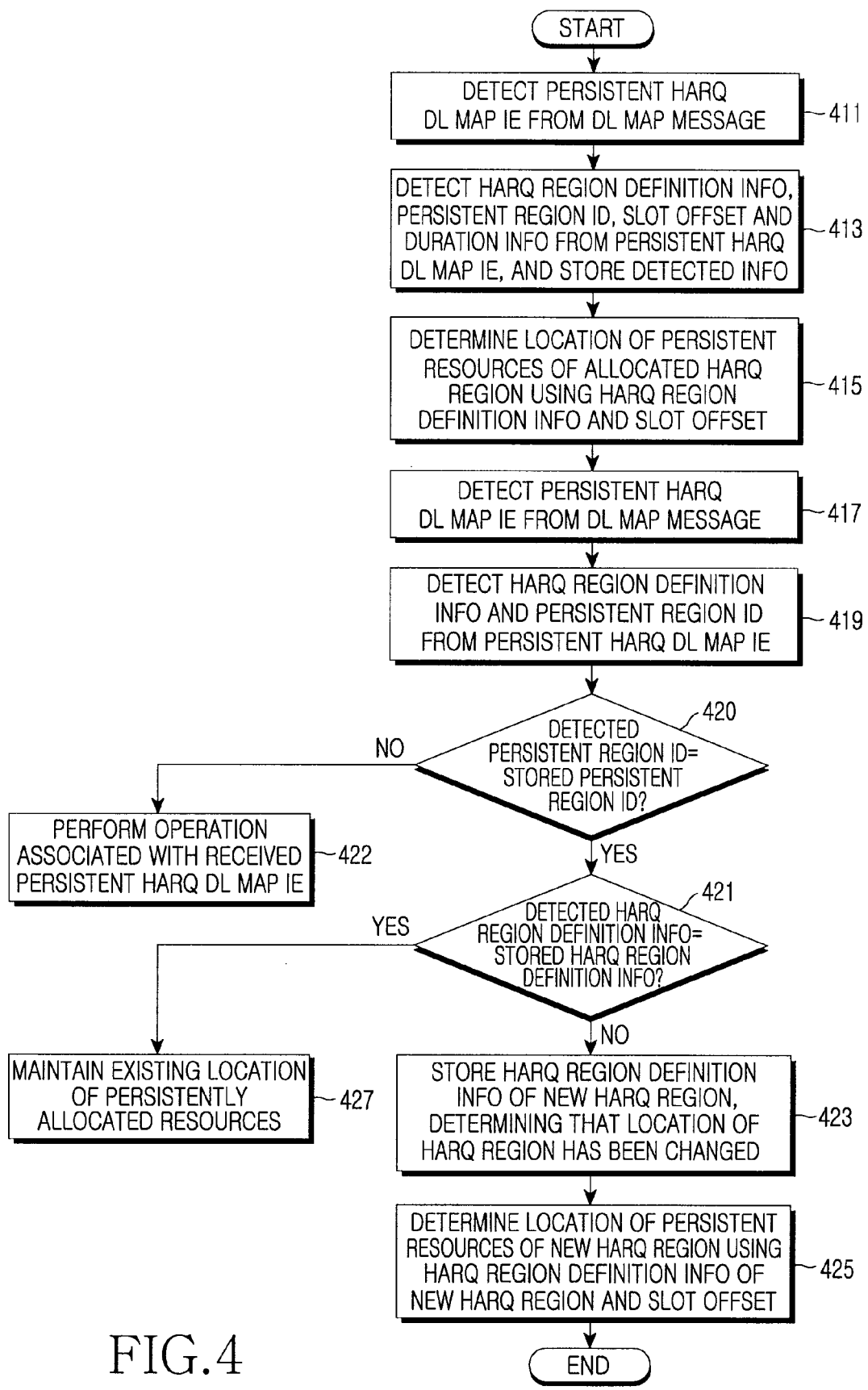
FIG. 4 is a flowchart illustrating a procedure in which an MS determines a location of DL persistent resources that a BS allocated using a persistent scheduling scheme in an IEEE 802.16 communication system according to an exemplary embodiment of the present invention.

With reference to FIG. 4, a description will now be made of a method in which an MS determines a location of DL persistent resources that a BS allocated using a persistent scheduling scheme in an IEEE 802.16 communication system according to an exemplary embodiment of the present invention.

FIG. 4 is a flowchart illustrating a procedure in which an MS determines a location of DL persistent resources that a BS allocated using a persistent scheduling scheme in an IEEE 802.16 communication system according to an exemplary embodiment of the present invention.

Referring to FIG. 4, in step 411, the MS receives a DL MAP message from a BS, and detects a Persistent HARQ DL MAP IE included in the DL MAP message. In step 413, the MS detects, from the Persistent HARQ DL MAP IE, HARQ region definition information, a Persistent Region ID, a slot offset and duration information, and stores the detected HARQ region definition information, Persistent Region ID, slot offset and duration information. In step 415, the MS determines a location of persistent resources in the HARQ region allocated to the MS using the HARQ region definition information and the slot offset, and then proceeds to step 417. A detailed description will now be made of a process in which the MS determines a location of the persistent resources.

The MS detects the HARQ region using the OFDMA symbol offset, the subchannel offset, the number of OFDMA symbols and the number of subchannels, included in the HARQ region definition information, and detects a start region of the HARQ region using the OFDMA symbol offset and the subchannel offset. Thereafter, the MS determines, as a location of persistent resources allocated to the MS itself, a location which is spaced apart from the detected start region of the HARQ region by slots, a number of which corresponds to the slot offset.

In step 417, the MS receives a DL MAP message from the BS, and detects a Persistent HARQ DL MAP IE included in the DL MAP message. In step 419, the MS detects HARQ region definition information and a Persistent Region ID from the Persistent HARQ DL MAP IE. In step 420, the MS determines if the detected Persistent Region ID is identical to the stored Persistent Region ID. If it is determined that the detected Persistent Region ID is identical to the stored Persistent Region ID, the MS proceeds to step 421. However, if it is determined in step 420 that the detected Persistent Region ID is not identical to the stored Persistent Region ID, the MS proceeds to step 422. When the detected Persistent Region ID is not identical to the stored Persistent Region ID, the detected Persistent Region ID indicates a Persistent HARQ DL MAP IE for a HARQ region different from the HARQ region identified by the stored Persistent Region ID. Therefore, in step 422, the MS performs an operation associated with the corresponding Persistent HARQ DL MAP IE.

In step 421, the MS determines if the detected HARQ region definition information is identical to the stored HARQ region definition information. If it is determined that the detected HARQ region definition information is not identical to the stored HARQ region definition information, the MS, determining that a location of the HARQ region has been changed, stores HARQ region definition information of the location-changed HARQ region, or new HARQ region, in step 423.

Thereafter, in step 425, the MS determines a location of persistent resources of the new HARQ region, which are allocated to the MS after undergoing a location change, using HARQ region definition information of the new HARQ region and the stored slot offset. The MS detects the new HARQ region using an OFDMA symbol offset, a subchannel offset, the number of OFDMA symbols and the number of subchannels, included in the HARQ region definition information of the new HARQ region, and detects a start region of the new HARQ region using the OFDMA symbol offset and the subchannel offset. The MS determines, as a location of persistent resources allocated to the MS after undergoing a location change, the location that is spaced apart from the detected start region of the new HARQ region by slots, the number of which corresponds to the slot offset.

However, if it is determined in step 421 that the detected HARQ region definition information is identical to the stored HARQ region definition information, the MS proceeds to step 427 where it maintains the location of the resources persistently allocated to the MS.

Figure 5:
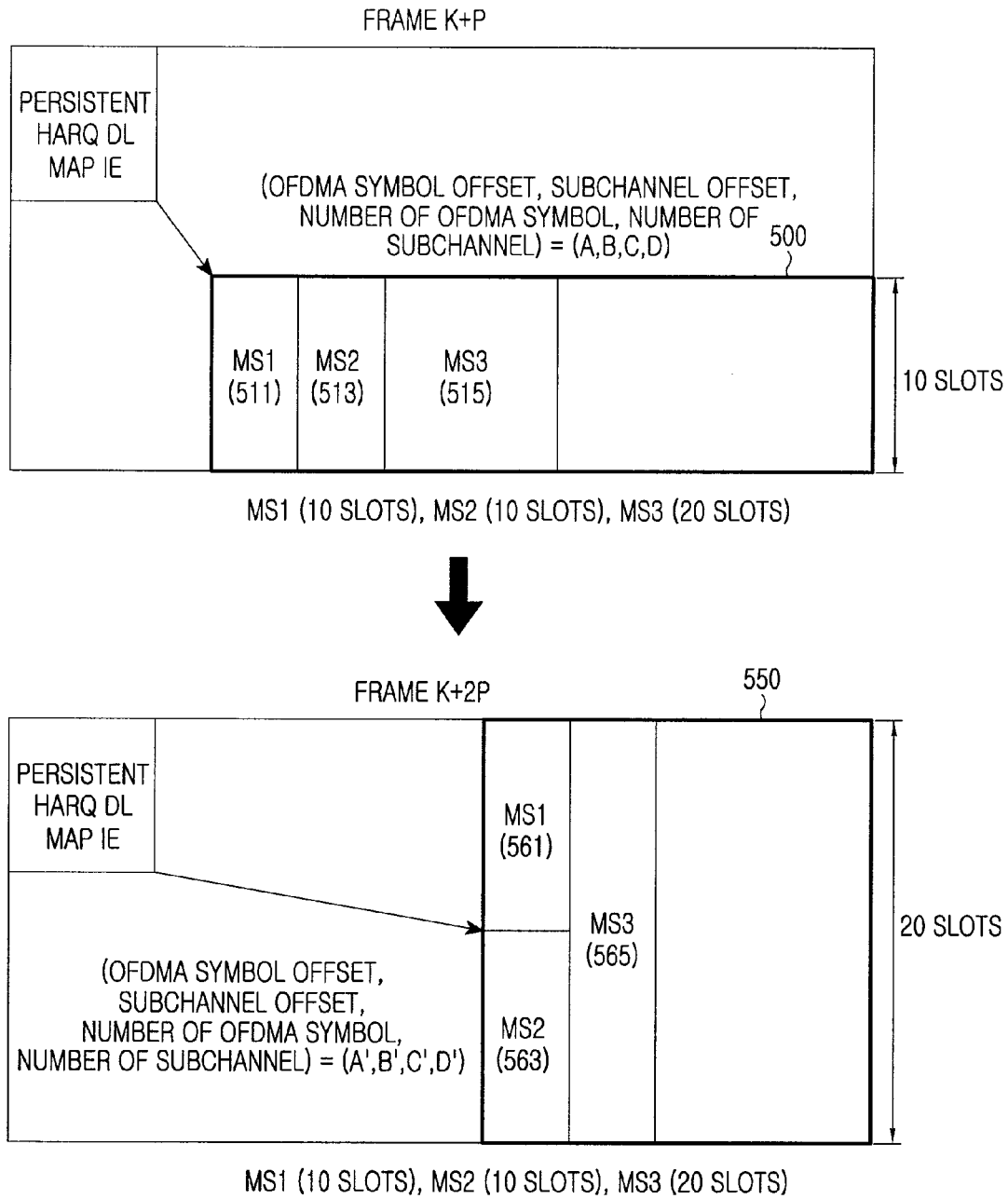
FIG. 5 is a diagram schematically illustrating a case where locations of DL resources persistently allocated to MSs are changed due to a location change of a HARQ region in an IEEE 802.16 communication system according to an exemplary embodiment of the present invention.

With reference to FIG. 5, a description will now be made of a case where locations of DL resources persistently allocated to MSs are changed due to a location change of a HARQ region in an IEEE 802.16 communication system according to an exemplary embodiment of the present invention.

FIG. 5 is a diagram schematically illustrating a case where locations of DL resources persistently allocated to MSs are changed due to a location change of a HARQ region in an IEEE 802.16 communication system according to an exemplary embodiment of the present invention.

Referring to FIG. 5, it will be assumed that in a frame # (K+P), persistent resources of 10 slots, 10 slots and 20 slots are allocated in a HARQ region 500 to MS1, MS2 and MS3, respectively. In addition, it will be assumed herein that the HARQ region 500 is defined by HARQ region definition information where OFDMA symbol offset=A, subchannel offset=B, the number of OFDMA symbols=C, and the number of subchannels=D (OFDMA SYMBOL OFFSET, SUBCHANNEL OFFSET, NUMBER OF OFDMA SYMBOL, NUMBER OF SUBCHANNEL)=(A,B,C,D)). Further, it will be assumed that a start region of persistent resources 511 allocated to the MS1 is identical to a start region of the HARQ region 500.

Therefore, the MS1, the MS2 and the MS3 each detect HARQ region definition information for the HARQ region 500, a Persistent Region ID for identifying the HARQ region 500, a slot offset and duration information, from the frame # (K+P) through a Persistent HARQ DL MAP IE, and determine persistent resources allocated to themselves using the detected HARQ region definition information, Persistent Region ID, slot offset and duration information. In addition, the MS1, the MS2 and the MS3 each store the detected HARQ region definition information, Persistent Region ID, slot offset and duration information in such a manner that the MS1 stores slot offset=0 and duration=10, the MS2 stores slot offset=10 and duration=10, and the MS3 stores slot offset=20 and duration=20.

Thereafter, if a location of the HARQ region is changed in frame # (K+2P), locations of the persistent resources allocated to the MS1, the MS2 and the MS3 are also changed. That is, persistent resources of the MS1, the MS2 and the MS3 are allocated in the location-changed HARQ region 500, or a new HARQ region 550, after undergoing a location change. It will be assumed herein that the new HARQ region 550, compared with the HARQ region 500, is doubled along the subchannel axis, and halved along the OFDMA symbol axis. Further, it will be assumed that the new HARQ region 550 is defined by HARQ region definition information where OFDMA symbol offset=A', subchannel offset=B', the number of OFDMA symbols=C', and the number of subchannels=D' (OFDMA SYMBOL OFFSET, SUBCHANNEL OFFSET, NUMBER OF OFDMA SYMBOL, NUMBER OF SUBCHANNEL)=(A',B',C',D')).

Therefore, the MS1, the MS2 and the MS3 each detect HARQ region definition information for the new HARQ region 550 and a Persistent Region ID from the frame # (K+2P) through a Persistent HARQ DL MAP IE, and determine locations of persistent resources allocated to themselves using the detected HARQ region definition information and the stored slot offset and duration information. Of course, the stored Persistent Region ID is identical to the detected Persistent Region ID. In this case, locations of the persistent resources 511, 513 and 515, which were allocated to the MS1, the MS2 and the MS3 in the frame # (K+P), are changed in the frame # (K+2P). That is, in the frame # (K+2P), persistent resources 561, 563 and 565 are allocated to the MS1, the MS2 and the MS3, respectively.

Figure 6:
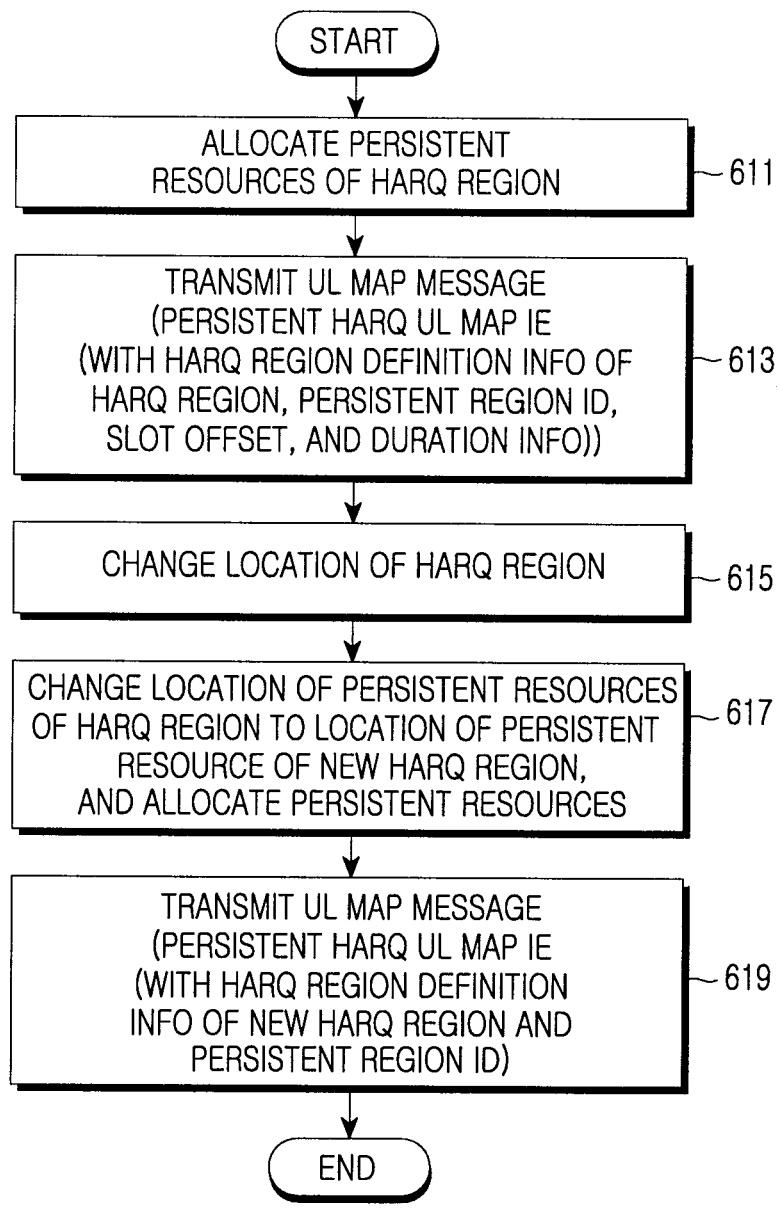
FIG. 6 is a flowchart illustrating a procedure for allocating UL resources using a persistent scheduling scheme by a BS in an IEEE 802.16 communication system according to an exemplary embodiment of the present invention.

With reference to FIG. 6, a description will now be made of a method for allocating UL resources using a persistent scheduling scheme by a BS in an IEEE 802.16 communication system according to an exemplary embodiment of the present invention.

FIG. 6 is a flowchart illustrating a procedure for allocating UL resources using a persistent scheduling scheme by a BS in an IEEE 802.16 communication system according to an exemplary embodiment of the present invention.

Referring to FIG. 6, in step 611, the BS allocates persistent resources of a HARQ region to an arbitrary MS. In step 613, the BS generates a UL MAP message including a Persistent HARQ UL MAP IE, transmits the generated UL MAP message to the MS, and then proceeds to step 615. The Persistent HARQ UL MAP IE includes HARQ region definition information, a Persistent Region ID for identifying the HARQ region, a slot offset and duration information.

The HARQ region definition information includes an OFDMA symbol offset and a subchannel offset. The HARQ region is defined herein by the OFDMA symbol offset and the subchannel offset. That is, in the UL, unlike in the DL, since the HARQ region is defined not in two dimensions, but in one dimension, the HARQ region is defined in one dimension beginning from the start region of the HARQ region. The start region represents a region corresponding to the lowest-numbered OFDMA symbol in the lowest-numbered subchannel of the HARQ region, and it will be assumed to be, for example, a slot. In addition, the allocated persistent resources include the slots that correspond to information on the duration from the location that is spaced apart from the start region by slots, the number of which corresponds to the slot offset. In conclusion, the slot offset is location information of the persistent resources.

In step 615, upon detecting the need to change a location of the HARQ region, the BS changes a location of the HARQ region, and then proceeds to step 617. Since the operation of detecting the need to change a location of the HARQ region is not a focus of the present invention, a detailed description thereof will be omitted herein. In step 617, the BS changes persistent resources of the HARQ region to persistent resources of the location-changed HARQ region, or new HARQ region, allocates the changed persistent resources to the MS, and then proceeds to step 619. A detailed description will now be made of a process in which the BS changes persistent resources of the HARQ region to persistent resources of a new HARQ region, and allocates the changed persistent resources to the MS.

A location of the new HARQ region is different from the location of the HARQ region, and HARQ region definition information representing the new HARQ region is also different from the HARQ region definition information of the HARQ region. Therefore, the BS changes the location of the persistent resources of the HARQ region allocated to the MS, to location of the slots that correspond to information on the duration from the location which is spaced apart from a start region of the new HARQ region by slots, the number of which corresponds to the slot offset, and then allocates the persistent resources.

In step 619, the BS generates a UL MAP message including the Persistent HARQ UL MAP IE, and transmits the generated UL MAP message to the MS. The Persistent HARQ UL MAP IE may include only the HARQ region definition information of the new HARQ region and the Persistent Region ID, and may not include the slot offset and the duration information. In addition, the HARQ region definition information of the new HARQ region may also include an OFDMA symbol offset and a subchannel offset. Of course, the Persistent Region ID included in the Persistent HARQ UL MAP IE described in step 619 is identical to Persistent Region ID included in the Persistent HARQ UL MAP IE described in step 613.

In the case where the BS persistently allocates resources to the MS as described in FIG. 6, even though a location of the HARQ region is changed, there is no need to separately include the slot offset and the duration information in the Persistent HARQ UL MAP IE.

Figure 7:
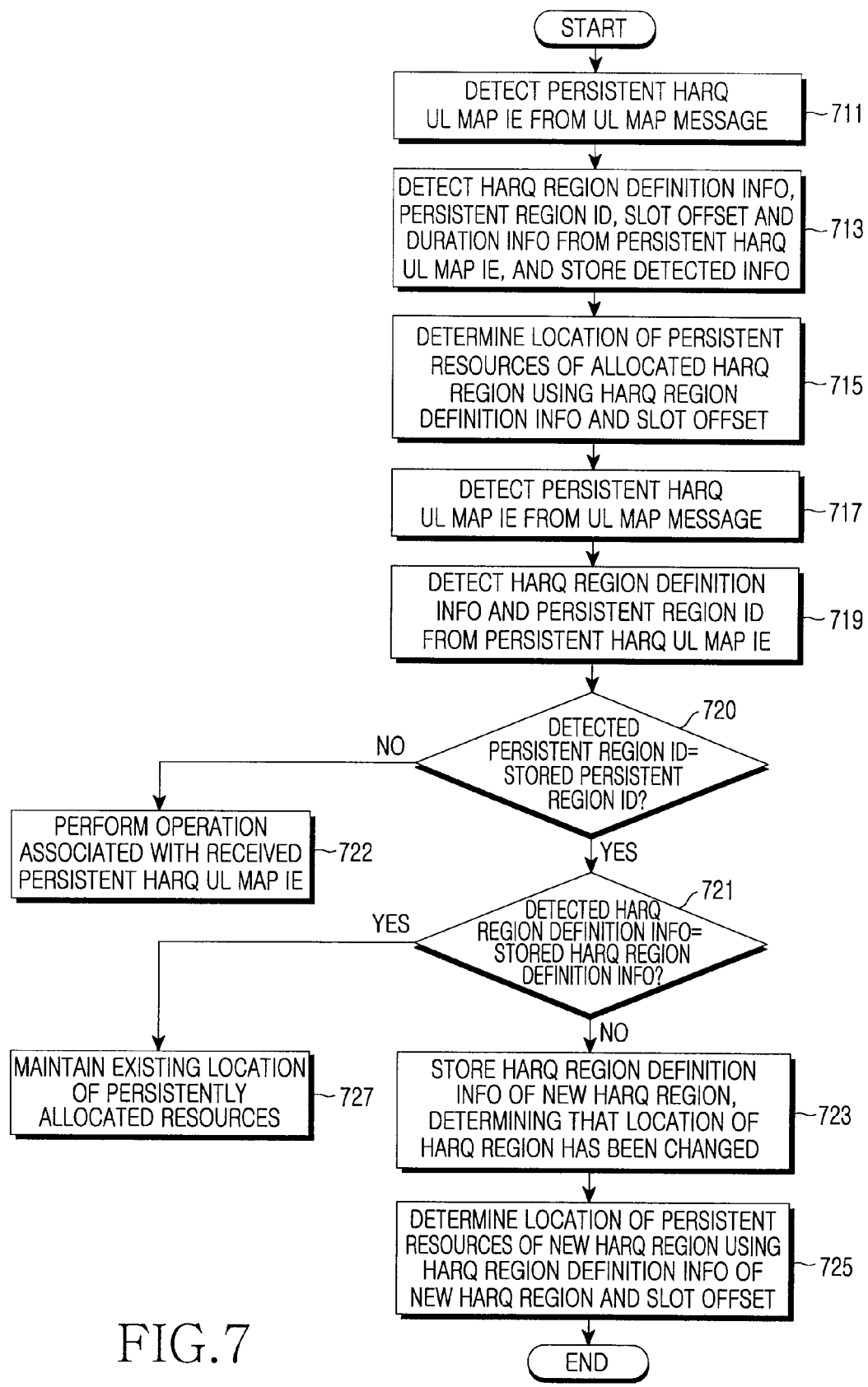
FIG. 7 is a flowchart illustrating a procedure in which an MS determines a location of UL persistent resources that a BS allocated using a persistent scheduling scheme in an IEEE 802.16 communication system according to an exemplary embodiment of the present invention.

With reference to FIG. 7, a description will now be made of a method in which an MS determines a location of UL resources that a BS allocated using a persistent scheduling scheme in an IEEE 802.16 communication system according to an exemplary embodiment of the present invention.

FIG. 7 is a flowchart illustrating a procedure in which an MS determines a location of UL persistent resources that a BS allocated using a persistent scheduling scheme in an IEEE 802.16 communication system according to an exemplary embodiment of the present invention.

Referring to FIG. 7, in step 711, the MS receives a UL MAP message from a BS, and detects a Persistent HARQ UL MAP IE included in the UL MAP message. In step 713, the MS detects HARQ region definition information, a Persistent Region ID, a slot offset and duration information from the Persistent HARQ UL MAP IE, and stores the detected HARQ region definition information, Persistent Region ID, slot offset and duration information. In step 715, the MS determines a location of persistent resources allocated to the MS using the HARQ region definition information and the slot offset, and then proceeds to step 717. A detailed description will now be made of a process in which the MS determines a location of the persistent resources.

The MS detects a start region of the HARQ region using an OFDMA symbol offset and a subchannel offset included in the HARQ region definition information. The MS determines, as a location of the persistent resources, the location that is spaced apart from the detected start region of the HARQ region by slots, the number of which corresponds to the slot offset.

In step 717, the MS receives a UL MAP message from the BS, and detects a Persistent HARQ UL MAP IE included in the UL MAP message. In step 719, the MS detects HARQ region definition information and a Persistent Region ID from the Persistent HARQ UL MAP IE. In step 720, the MS determines if the detected Persistent Region ID is identical to the stored Persistent Region ID. If it is determined that the detected Persistent Region ID is identical to the stored Persistent Region ID, the MS proceeds to step 721. However, if it is determined in step 720 that the detected Persistent Region ID is not identical to the stored Persistent Region ID, the MS proceeds to step 722. When the detected Persistent Region ID is not identical to the stored Persistent Region ID, the detected Persistent Region ID indicates a Persistent HARQ UL MAP IE for a HARQ region different from the HARQ region identified by the stored Persistent Region ID. Therefore, in step 722, the MS performs an operation associated with the corresponding Persistent HARQ UL MAP IE.

In step 721, the MS determines if the detected HARQ region definition information is identical to the stored HARQ region definition information. If it is determined that the detected HARQ region definition information is not identical to the stored HARQ region definition information, the MS, determining that a location of the HARQ region has been changed, stores HARQ region definition information of the location-changed HARQ region, or new HARQ region, in step 723.

Thereafter, in step 725, the MS determines a location of persistent resources of the new HARQ region, which are allocated to the MS after undergoing a location change, using the HARQ region definition information of the new HARQ region and the stored slot offset. The MS detects a start region of the new HARQ region using an OFDMA symbol offset and a subchannel offset included in the HARQ region definition information of the new HARQ region. The MS determines, as a location of persistent resources allocated to the MS after undergoing a location change, the location that is spaced apart from the detected start region of the new HARQ region by slots, the number of which corresponds to the slot offset.

However, if it is determined in step 721 that the received HARQ region definition information is identical to the stored HARQ region definition information, the MS proceeds to step 727 where it maintains the location of the resources persistently allocated to the MS.

Figure 8:
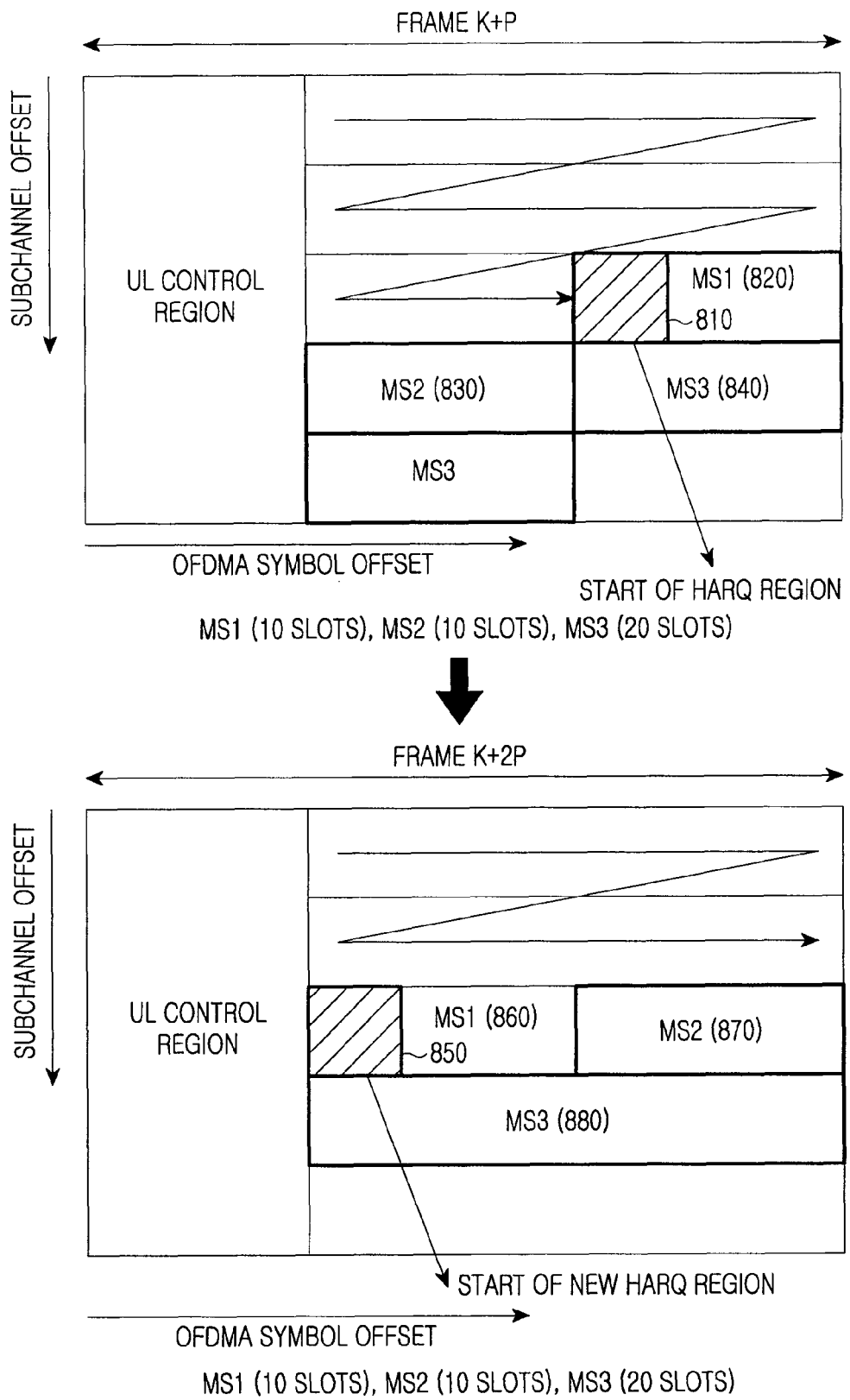
FIG. 8 is a diagram schematically illustrating a case where locations of UL resources persistently allocated to MSs are changed due to a location change of a HARQ region in an IEEE 802.16 communication system according to an exemplary embodiment of the present invention.

With reference to FIG. 8, a description will now be made of a case where locations of UL resources persistently allocated to MSs are changed due to a location change of a HARQ region in an IEEE 802.16 communication system according to an exemplary embodiment of the present invention.

FIG. 8 is a diagram schematically illustrating a case where locations of UL resources persistently allocated to MSs are changed due to a location change of a HARQ region in an IEEE 802.16 communication system according to an exemplary embodiment of the present invention.

Referring to FIG. 8, it will be assumed herein that in a frame # (K+P), persistent resources of 10 slots, 10 slots and 20 slots are allocated to MS1, MS2 and MS3, respectively, starting from a start region 810 of the HARQ region. In addition, it will be assumed herein that the HARQ region is defined by HARQ region definition information where OFDMA symbol offset=A and subchannel offset=B (OFDMA SYMBOL OFFSET, SUBCHANNEL OFFSET)= (A,B)). Further, it will be assumed that a start region of persistent resources 820 allocated to the MS1 is identical to the start region 810 of the HARQ region.

Therefore, the MS1, the MS2 and the MS3 each detect HARQ region definition information for the HARQ region, a Persistent Region ID for identifying the HARQ region, a slot offset and duration information, from the frame # (K+P) through the Persistent HARQ UL MAP IE, and determine persistent resources allocated to themselves using the detected HARQ region definition information, Persistent Region ID, slot offset and duration information. In addition, the MS1, the MS2 and the MS3 each store the detected HARQ region definition information, Persistent Region ID, slot offset, duration information in such a manner that the MS1 stores slot offset=0 and duration=10, the MS2 stores slot offset=10 and duration=10, and the MS3 stores slot offset=20 and duration=20.

Thereafter, if a location of the HARQ region is changed in a frame # (K+2P), locations of the persistent resources allocated to the MS1, the MS2 and the MS3 are also changed. That is, persistent resources of the MS1, the MS2 and the MS3 are allocated in the location-changed HARQ region, or a new HARQ region, after undergoing a location change. It will be assumed herein that the new HARQ region is defined by HARQ region definition information where OFDMA symbol offset=A' and subchannel offset=B' ((OFDMA SYMBOL OFFSET, SUBCHANNEL OFFSET)=(A',B')).

Therefore, the MS1, the MS2 and the MS3 each detect HARQ region definition information for the new HARQ region and the Persistent Region ID from the frame # (K+2P) through the Persistent HARQ UL MAP IE, and determine persistent resources allocated themselves using the detected HARQ region definition information and the stored slot offset and duration information. Of course, the stored Persistent Region ID is identical to the detected Persistent Region ID. In this case, locations of the persistent resources 820, 830 and 840, which were allocated to the MS1, the MS2 and the MS3 in the frame # (K+P), are changed in the frame # (K+2P). That is, in the frame # (K+2P), persistent resources 860, 870 and 880 are allocated to the MS1, the MS2 and the MS3, respectively, starting from a start region 850 of the new HARQ region.

Figure 9:
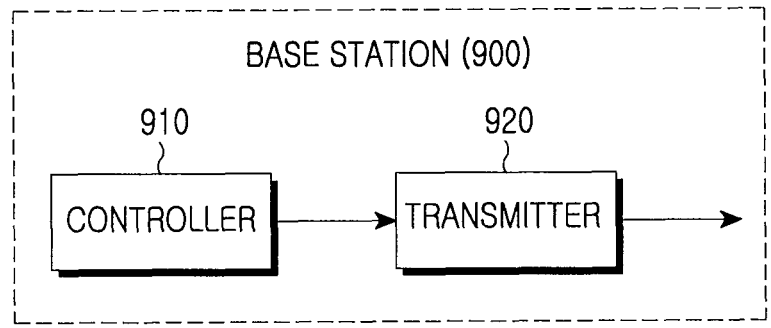
FIG. 9 is a diagram illustrating an internal structure of a BS apparatus in an IEEE 802.16 communication system according to an exemplary embodiment of the present invention.

With reference to FIG. 9, a description will now be made of an internal structure of a BS apparatus in an IEEE 802.16 communication system according to an exemplary embodiment of the present invention.

FIG. 9 is a diagram illustrating an internal structure of a BS apparatus in an IEEE 802.16 communication system according to an exemplary embodiment of the present invention.

Referring to FIG. 9, a BS apparatus 900 includes a controller 910 and a transmitter 920. The controller 910 allocates DL resources and UL resources using a persistent scheduling scheme, and generates resource allocation messages for the allocated DL resources and UL resources. In particular, the controller 910 allocates DL resources and UL resources taking into account a location change of a HARQ region, and generates resource allocation messages for the allocated DL resources and UL resources. The operation in which the controller 910 allocates DL resources and UL resources has been described with reference to FIGS. 3 and 6.

The resource allocation messages generated in the controller 910 are delivered to the transmitter 920, and the transmitter 920 transmits the resource allocation messages generated by the controller 910 to MSs. The term 'resource allocation message' as used herein refers to, for example, the DL MAP message including a Persistent HARQ DL MAP IE, or the UL MAP message including a Persistent HARQ UL MAP IE. A detailed description of the Persistent HARQ DL MAP IE and the Persistent HARQ UL MAP IE has been made above.

Figure 10:
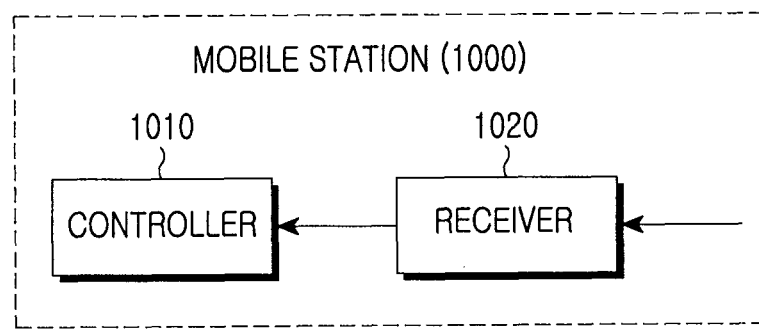
FIG. 10 is a diagram illustrating an internal structure of an MS apparatus in an IEEE 802.16 communication system according to an exemplary embodiment of the present invention.

With reference to FIG. 10, a description will now be made of an internal structure of an MS apparatus in an IEEE 802.16 communication system according to an exemplary embodiment of the present invention.

FIG. 10 is a diagram illustrating an internal structure of an MS apparatus in an IEEE 802.16 communication system according to an exemplary embodiment of the present invention.

Referring to FIG. 10, an MS apparatus 1000 includes a controller 1010 and a receiver 1020.

The controller 1010 determines locations of DL resources and UL resources that a BS allocated using a persistent scheduling scheme, and uses the location-determined DL persistent resources and UL persistent resources. The operation in which the controller 1010 determines locations of DL resources and UL resources that the BS allocated using the persistent scheduling scheme has been described with reference to FIGS. 4 and 7.

The receiver 1020 receives a resource allocation message from the BS. The term 'resource allocation message' as used herein refers to, for example, the DL MAP message including a Persistent HARQ DL MAP IE, or the UL MAP message including a Persistent HARQ UL MAP IE. A detailed description of the Persistent HARQ DL MAP IE and the Persistent HARQ UL MAP IE has been made above. That is, the controller 1010 determines locations of the DL resources and UL resources that the BS allocated using the persistent scheduling scheme, depending on the resource allocation message that the receiver 1020 received. In addition, the controller 1010 can store, in its internal memory, various information such as a Persistent Region ID, HARQ region definition information of a HARQ region, and HARQ region definition information of a new HARQ region. Alternatively, the controller 1010 can store the various information such as a Persistent Region ID, HARQ region definition information of a HARQ region, and HARQ region definition information of a new HARQ region, not in the internal memory, but in a separate memory.

As is apparent from the foregoing description, according to exemplary embodiments of the present invention, the communication system can allocate resources while taking into account a location change of a HARQ region in allocating resources using the persistent scheduling scheme, thereby contributing to an increase in resource allocation flexibility of the communication system and thus improving the system performance.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for allocating resources by a Base Station (BS) in a wireless communication system, the method comprising:
   allocating persistent resources in a Hybrid Automatic Repeat Request (HARQ) region to a Mobile Station (MS);
   changing a location of the HARQ region; and
   allocating persistent resources in a new HARQ region, which is the location-changed HARQ region, to the MS,
   wherein a location of the persistent resources in the HARQ region is identical to a location of the persistent resources in the new HARQ region, and
   wherein the persistent resources are persistently maintained without being changed every frame, unless the BS releases resource allocation for the MS or changes the resources allocated to the MS.

2. The method of claim 1, wherein when the HARQ region and the new HARQ region each comprise DownLink (DL) resources, the HARQ region and the new HARQ region each is defined by HARQ region definition information, and the HARQ region definition information includes an Orthogonal Frequency Division Multiple Access (OFDMA) symbol offset, a subchannel offset, a number of OFDMA symbols, and a number of subchannels;
   wherein a Persistent Region Identifier (ID) of the HARQ region is identical to a Persistent Region ID of the new HARQ region; and
   wherein the location of the persistent resources in the HARQ region and the location of the persistent resources in the new HARQ region each is determined according to a slot offset.

3. The method of claim 2, wherein the slot offset of the persistent resources in the HARQ region is counted from a lowest-numbered OFDMA symbol in a lowest-numbered subchannel of the HARQ region, and the slot offset of the persistent resources in the new HARQ region is counted from a lowest-numbered OFDMA symbol in a lowest-numbered subchannel of the new HARQ region.

4. The method of claim 1, wherein when the HARQ region and the new HARQ region each comprise UpLink (UL) resources, the HARQ region and the new HARQ region each is defined by HARQ region definition information, and the HARQ region definition information includes an Orthogonal Frequency Division Multiple Access (OFDMA) symbol offset and a subchannel offset;
   wherein a Persistent Region Identifier (ID) of the HARQ region is identical to a Persistent Region ID of the new HARQ region; and
   wherein the location of the persistent resources in the HARQ region and the location of the persistent resources in the new HARQ region each is determined according to a slot offset.

5. The method of claim 4, wherein the slot offset of the persistent resources in the HARQ region is counted from a start region defined by an OFDMA symbol offset and a subchannel offset, used for defining the HARQ region, and the slot offset of the persistent resources in the new HARQ region is counted from a start region defined by an OFDMA symbol offset and a subchannel offset, used for defining the new HARQ region.

6. A method for allocating resources by a Base Station (BS) in a wireless communication system, the method comprising:
   transmitting to a Mobile Station (MS) a first resource allocation message including Hybrid Automatic Repeat Request (HARQ) region definition information of a HARQ region, a Persistent Region Identifier (ID), and location information of persistent resources in the HARQ region to allocate the persistent resources in the HARQ region to the MS;
   when a location of the HARQ region is changed, setting a Persistent Region ID of a new HARQ region, which is the location-changed HARQ region, to be identical to the Persistent Region ID of the HARQ region; and transmitting to the MS a second resource allocation message including HARQ region definition information of the new HARQ region and the Persistent Region ID of the new HARQ region, wherein the location information of the persistent resources in the HARQ region is identical to location information of persistent resources in the new HARQ region, and wherein the persistent resources are persistently maintained without being changed every frame, unless the BS releases resource allocation for the MS or changes the resources allocated to the MS.

7. The method of claim 6, wherein when the HARQ region and the new HARQ region each comprise DownLink (DL) resources, the HARQ region definition information of the HARQ region and the HARQ region definition information of the new HARQ region each include an Orthogonal Frequency Division Multiple Access (OFDMA) symbol offset, a subchannel offset, the number of OFDMA symbols, and the number of subchannels; and wherein the location information of the persistent resources in the HARQ region and the location information of the persistent resources in the new HARQ region each is determined according to a slot offset.

8. The method of claim 7, wherein the slot offset of the persistent resources in the HARQ region is counted from a lowest-numbered OFDMA symbol in a lowest-numbered subchannel of the HARQ region, and the slot offset of the persistent resources in the new HARQ region is counted from a lowest-numbered OFDMA symbol in a lowest-numbered subchannel of the new HARQ region.

9. The method of claim 6, wherein when the HARQ region and the new HARQ region each comprise UpLink (UL) resources, the HARQ region and the new HARQ region each is defined by HARQ region definition information, and the HARQ region definition information includes an Orthogonal Frequency Division Multiple Access (OFDMA) symbol offset and a subchannel offset; and wherein the location information of the persistent resources in the HARQ region and the location information of the persistent resources in the new HARQ region each is determined according to a slot offset.

10. The method of claim 9, wherein the slot offset of the persistent resources in the HARQ region is counted from a start region defined by an OFDMA symbol offset and a subchannel offset, used for defining the HARQ region, and the slot offset of the persistent resources in the new HARQ region is counted from a start region defined by an OFDMA symbol offset and a subchannel offset, used for defining the new HARQ region.

11. A method for allocating resources by a Mobile Station (MS) in a wireless communication system, the method comprising:

receiving a first resource allocation message used for allocating persistent resources in a Hybrid Automatic Repeat Request (HARQ) region;

determining a location of the HARQ region according to the first resource allocation message;

receiving a second resource allocation message used for allocating the persistent resources in a new HARQ region, which is a location-changed HARQ region; and determining a location of the new HARQ region according to the second resource allocation message, wherein a location of the persistent resources in the HARQ region is identical to a location of the persistent resources in the new HARQ region, and wherein the persistent resources are persistently maintained without being changed every frame, unless the BS releases resource allocation for the MS or changes the resources allocated to the MS.

12. The method of claim 11, wherein when the HARQ region and the new HARQ region each comprise DownLink (DL) resources, the HARQ region and the new HARQ region each is defined by HARQ region definition information, and the HARQ region definition information includes an Orthogonal Frequency Division Multiple Access (OFDMA) symbol offset, a subchannel offset, the number of OFDMA symbols, and the number of subchannels; and wherein a Persistent Region Identifier (ID) of the HARQ region is identical to a Persistent Region ID of the new HARQ region, and the location of the persistent resources in the HARQ region and the location of the persistent resources in the new HARQ region each is determined according to a slot offset.

13. The method of claim 12, wherein the slot offset of the persistent resources in the HARQ region is counted from a lowest-numbered OFDMA symbol in a lowest-numbered subchannel of the HARQ region, and the slot offset of the persistent resources in the new HARQ region is counted from a lowest-numbered OFDMA symbol in a lowest-numbered subchannel of the new HARQ region.

14. The method of claim 11, wherein when the HARQ region and the new HARQ region each comprise UpLink (UL) resources, the HARQ region and the new HARQ region each is defined by HARQ region definition information, and the HARQ region definition information includes an Orthogonal Frequency Division Multiple Access (OFDMA) symbol offset and a subchannel offset;

wherein a Persistent Region Identifier (ID) of the HARQ region is identical to a Persistent Region ID of the new HARQ region; and wherein the location of the persistent resources in the HARQ region and the location of the persistent resources in the new HARQ region each is determined according to a slot offset.

15. The method of claim 14, wherein the slot offset of the persistent resources of the HARQ region is counted from a start region defined by an OFDMA symbol offset and a subchannel offset, used for defining the HARQ region, and the slot offset of the persistent resources in the new HARQ region is counted from a start region defined by an OFDMA symbol offset and a subchannel offset, used for defining the new HARQ region.

16. A method for allocating resources by a Mobile Station (MS) in a wireless communication system, the method comprising:

receiving a first resource allocation message including Hybrid Automatic Repeat Request (HARQ) region definition information of a HARQ region, a Persistent Region Identifier (ID), and location information of persistent resources in the HARQ region to allocate the persistent resources in the HARQ region;

storing the HARQ region definition information and the Persistent Region ID;

determining a location of the HARQ region according to the first resource allocation message; and upon receipt of a second resource allocation message including a Persistent Region ID identical to the stored Persistent Region ID, determining a location of a new HARQ region according to the second resource allocation message, wherein the new HARQ region is a location-changed HARQ region, and the second resource allocation message includes HARQ region definition information of the new HARQ region and the Persistent Region ID of the new HARQ region, wherein a location of the persistent resources in the HARQ region is identical to a location of the persistent resources in the new HARQ region, and wherein the persistent resources are persistently maintained without being changed every frame, unless the BS releases resource allocation for the MS or changes the resources allocated to the MS.

17. The method of claim 16, wherein when the HARQ region and the new HARQ region each comprise DownLink (DL) resources, the HARQ region definition information of the HARQ region and the HARQ region definition information of the new HARQ region each include an Orthogonal Frequency Division Multiple Access (OFDMA) symbol offset, a subchannel offset, the number of OFDMA symbols, and the number of subchannels; and wherein the location of the persistent resources in the HARQ region is determined according to a slot offset.

18. The method of claim 17, wherein the slot offset of the persistent resources in the HARQ region is counted from a lowest-numbered OFDMA symbol in a lowest-numbered subchannel of the HARQ region.

19. The method of claim 16, wherein when the HARQ region and the new HARQ region each comprise UpLink (UL) resources, the HARQ region definition information of the HARQ region and the HARQ region definition information of the new HARQ region each include an Orthogonal Frequency Division Multiple Access (OFDMA) symbol offset and a subchannel offset; and wherein the location of the persistent resources in the HARQ region is determined according to a slot offset.

20. The method of claim 19, wherein the slot offset of the persistent resources in the HARQ region is counted from a start region defined by an OFDMA symbol offset and a subchannel offset included in the HARQ region definition information of the HARQ region.

21. The method of claim 16, wherein when the location information of the persistent resources in the HARQ region comprises a slot offset, the location of the persistent resources in the new HARQ region is determined according to the HARQ region definition information of the new HARQ region and the slot offset.

22. The method of claim 16, further comprising:
storing the HARQ region definition information of the new HARQ region.

23. A Base Station (BS) apparatus in a wireless communication system, the apparatus comprising:
a controller for allocating persistent resources in a Hybrid Automatic Repeat Request (HARQ) region to a Mobile Station (MS), for changing a location of the HARQ region, and for allocating the persistent resources in a new HARQ region, which is the location-changed HARQ region, to the MS, wherein a location of the persistent resources in the HARQ region is identical to a location of the persistent resources in the new HARQ region, and wherein the persistent resources are persistently maintained without being changed every frame, unless the BS releases the persistent resources allocated to the MS or changes the persistent resources allocated to the MS.

24. The apparatus of claim 23, wherein when the HARQ region and the new HARQ region each comprise DownLink (DL) resources, the HARQ region and the new HARQ region each is defined by HARQ region definition information, and the HARQ region definition information includes an Orthogonal Frequency Division Multiple Access (OFDMA) symbol offset, a subchannel offset, the number of OFDMA symbols, and the number of subchannels;

wherein a Persistent Region Identifier (ID) of the HARQ region is identical to a Persistent Region ID of the new HARQ region; and wherein the location of the persistent resources in the HARQ region and the location of the persistent resources in the new HARQ region each is determined according to a slot offset.

25. The apparatus of claim 24, wherein the slot offset of the persistent resources in the HARQ region is counted from a lowest-numbered OFDMA symbol in a lowest-numbered subchannel of the HARQ region, and the slot offset of the persistent resources in the new HARQ region is counted from a lowest-numbered OFDMA symbol in a lowest-numbered subchannel of the new HARQ region.

26. The apparatus of claim 23, wherein when the HARQ region and the new HARQ region each comprise UpLink (UL) resources, the HARQ region and the new HARQ region each is defined by HARQ region definition information, and the HARQ region definition information includes an Orthogonal Frequency Division Multiple Access (OFDMA) symbol offset and a subchannel offset;

wherein a Persistent Region Identifier (ID) of the HARQ region is identical to a Persistent Region ID of the new HARQ region; and wherein the location of the persistent resources in the HARQ region and the location of the persistent resources in the new HARQ region each is determined according to a slot offset.

27. The apparatus of claim 26, wherein the slot offset of the persistent resources in the HARQ region is counted from a start region defined by an OFDMA symbol offset and a subchannel offset, used for defining the HARQ region, and the slot offset of the persistent resources in the new HARQ region is counted from a start region defined by an OFDMA symbol offset and a subchannel offset, used for defining the new HARQ region.

28. A Base Station (BS) apparatus in a wireless communication system, the apparatus comprising:
a transmitter for transmitting to a Mobile Station (MS) a first resource allocation message including Hybrid Automatic Repeat Request (HARQ) region definition information of a HARQ region, a Persistent Region Identifier (ID), and location information of persistent resources in the HARQ region to allocate the persistent resources in the HARQ region to the MS, and for transmitting to the MS a second resource allocation message including HARQ region definition information and a Persistent Region ID of a new HARQ region; and a controller, when a location of the HARQ region is changed, for setting a Persistent Region ID of the new HARQ region, which comprises the location-changed HARQ region, to be identical to the Persistent Region ID of the HARQ region, wherein the location information of the persistent resources in the HARQ region is identical to location information of persistent resources in the new HARQ region, and wherein the persistent resources are persistently maintained without being changed every frame, unless the BS releases resource allocation for the MS or changes the resources allocated to the MS.

29. The apparatus of claim 28, wherein when the HARQ region and the new HARQ region each comprise DownLink (DL) resources, the HARQ region definition information of the HARQ region and the HARQ region definition information of the new HARQ region each include an Orthogonal Frequency Division Multiple Access (OFDMA) symbol offset, a subchannel offset, the number of OFDMA symbols, and the number of subchannels; and wherein the location information of the persistent resources in the HARQ region and the location information of the persistent resources in the new HARQ region each is determined according to a slot offset.

30. The apparatus of claim 29, wherein the slot offset of the persistent resources in the HARQ region is counted from a lowest-numbered OFDMA symbol in a lowest-numbered subchannel of the HARQ region, and the slot offset of the persistent resources in the new HARQ region is counted from a lowest-numbered OFDMA symbol in a lowest-numbered subchannel of the new HARQ region.

31. The apparatus of claim 28, wherein when the HARQ region and the new HARQ region each comprise UpLink (UL) resources, the HARQ region and the new HARQ region each is defined by HARQ region definition information, and the HARQ region definition information includes an Orthogonal Frequency Division Multiple Access (OFDMA) symbol offset and a subchannel offset; and wherein the location information of the persistent resources in the HARQ region and the location information of the persistent resources in the new HARQ region each is determined according to a slot offset.

32. The apparatus of claim 31, wherein the slot offset of the persistent resources in the HARQ region is counted from a start region defined by an OFDMA symbol offset and a subchannel offset, used for defining the HARQ region, and the slot offset of the persistent resources in the new HARQ region is counted from a start region defined by an OFDMA symbol offset and a subchannel offset, used for defining the new HARQ region.

33. A Mobile Station (MS) apparatus in a wireless communication system, the apparatus comprising:

a receiver for receiving a first resource allocation message used for allocating persistent resources in a Hybrid Automatic Repeat Request (HARQ) region, for receiving a second resource allocation message used for allocating the persistent resources in a new HARQ region, which is a location-changed HARQ region; and a controller for determining a location of the HARQ region according to the first resource allocation message, and for determining a location of the new HARQ region according to the second resource allocation message, wherein a location of the persistent resources in the HARQ region is identical to a location of the persistent resources in the new HARQ region, and wherein the persistent resources are persistently maintained without being changed every frame, unless the BS releases resource allocation for the MS or changes the resources allocated to the MS.

34. The apparatus of claim 33, wherein when the HARQ region and the new HARQ region each comprise DownLink (DL) resources, the HARQ region and the new HARQ region each is defined by HARQ region definition information, and the HARQ region definition information includes an Orthogonal Frequency Division Multiple Access (OFDMA) symbol offset, a subchannel offset, the number of OFDMA symbols, and the number of subchannels; and wherein a Persistent Region Identifier (ID) of the HARQ region is identical to a Persistent Region ID of the new HARQ region, and the location of the persistent resources in the HARQ region and the location of the persistent resources in the new HARQ region each is determined according to a slot offset.

35. The apparatus of claim 34, wherein the slot offset of the persistent resources in the HARQ region is counted from a lowest-numbered OFDMA symbol in a lowest-numbered subchannel of the HARQ region, and the slot offset of the persistent resources in the new HARQ region is counted from a lowest-numbered OFDMA symbol in a lowest-numbered subchannel of the new HARQ region.

36. The apparatus of claim 33, wherein when the HARQ region and the new HARQ region each comprise UpLink (UL) resources, the HARQ region and the new HARQ region each is defined by HARQ region definition information, and the HARQ region definition information includes an Orthogonal Frequency Division Multiple Access (OFDMA) symbol offset and a subchannel offset;

wherein a Persistent Region Identifier (ID) of the HARQ region is identical to a Persistent Region ID of the new HARQ region; and wherein the location of the persistent resources in the HARQ region and the location of the persistent resources in the new HARQ region each is determined according to a slot offset.

37. The apparatus of claim 36, wherein the slot offset of the persistent resources of the HARQ region is counted from a start region defined by an OFDMA symbol offset and a subchannel offset, used for defining the HARQ region, and the slot offset of the persistent resources in the new HARQ region is counted from a start region defined by an OFDMA symbol offset and a subchannel offset, used for defining the new HARQ region.

38. A Mobile Station (MS) apparatus in a wireless communication system, the apparatus comprising:

a receiver for receiving a first resource allocation message including Hybrid Automatic Repeat Request (HARQ) region definition information of a HARQ region, a Persistent Region Identifier (ID), and location information of persistent resources in the HARQ region to allocate the persistent resources in the HARQ region, and for receiving a second resource allocation message including a Persistent Region ID; and a controller for storing the HARQ region definition information and the Persistent Region ID, for determining a location of the HARQ region according to the first resource allocation message, and for determining a location of a new HARQ region according to the second resource allocation message if the Persistent Region ID included in the second resource allocation message is identical to the stored Persistent Region ID, wherein the new HARQ region is a location-changed HARQ region, and the second resource allocation message includes HARQ region definition information of the new HARQ region and the Persistent Region ID of the new HARQ region, wherein a location of the persistent resources in the HARQ region is identical to a location of the persistent resources in the new HARQ region, and wherein the persistent resources are persistently maintained without being changed every frame, unless the BS releases resource allocation for the MS or changes the resources allocated to the MS.

39. The apparatus of claim 38, wherein when the HARQ region and the new HARQ region each comprise DownLink (DL) resources, the HARQ region definition information of the HARQ region and the HARQ region definition information of the new HARQ region each include an Orthogonal Frequency Division Multiple Access (OFDMA) symbol offset, a subchannel offset, the number of OFDMA symbols, and the number of subchannels; and wherein the location of the persistent resources in the HARQ region is determined according to a slot offset.

40. The apparatus of claim 39, wherein the slot offset of the persistent resources in the HARQ region is counted from a lowest-numbered OFDMA symbol in a lowest-numbered subchannel of the HARQ region.

41. The apparatus of claim 38, wherein when the HARQ region and the new HARQ region each comprise UpLink (UL) resources, the HARQ region definition information of the HARQ region and the HARQ region definition information of the new HARQ region each include an Orthogonal Frequency Division Multiple Access (OFDMA) symbol offset and a subchannel offset; and wherein the location of the persistent resources in the HARQ region is determined according to a slot offset.

42. The apparatus of claim 41, wherein the slot offset of the persistent resources in the HARQ region is counted from a start region defined by an OFDMA symbol offset and a subchannel offset included in the HARQ region definition information of the HARQ region.

43. The apparatus of claim 38, wherein when the location information of the persistent resources in the HARQ region comprises a slot offset, the location of the persistent resources in the new HARQ region is determined according to the HARQ region definition information of the new HARQ region and the slot offset.

44. The apparatus of claim 38, wherein the controller stores the HARQ region definition information of the new HARQ region.

* * * * *